United States Patent
Edwards

(10) Patent No.: US 9,121,941 B2
(45) Date of Patent: Sep. 1, 2015

(54) METHOD OF DETECTING A CLUTTER RETURN AT A SENSOR

(75) Inventor: Philip Trevelyan Edwards, Newport (GB)

(73) Assignee: BAE SYSTEMS PLC, London (GB)

(*) Notice: Subject to any disclaimer, the term of this patent is extended or adjusted under 35 U.S.C. 154(b) by 385 days.

(21) Appl. No.: 13/520,247

(22) PCT Filed: Dec. 21, 2010

(86) PCT No.: PCT/GB2010/052173
§ 371 (c)(1),
(2), (4) Date: Jul. 2, 2012

(87) PCT Pub. No.: WO2011/083301
PCT Pub. Date: Jul. 14, 2011

(65) Prior Publication Data
US 2013/0016002 A1    Jan. 17, 2013

(30) Foreign Application Priority Data
Jan. 7, 2010   (EP) .................................. 10250020
Jan. 7, 2010   (GB) .................................. 1000209.5

(51) Int. Cl.
*G01S 13/00*   (2006.01)
*G01S 13/524*  (2006.01)
*G01S 7/292*   (2006.01)

(52) U.S. Cl.
CPC ........... *G01S 13/5242* (2013.01); *G01S 7/2927* (2013.01); *G01S 13/5246* (2013.01)

(58) Field of Classification Search
CPC  G01S 13/5242; G01S 13/5246; G01S 7/2927
USPC ............................................ 342/159
See application file for complete search history.

(56) References Cited

U.S. PATENT DOCUMENTS 5,644,315 A   7/1997  Long
6,252,540 B1  6/2001  Hale et al.

FOREIGN PATENT DOCUMENTS

| EP | 0 227 457 | 7/1987 |
| WO | WO 98/22834 A1 | 5/1998 |
| WO | WO 2009/027718 A1 | 3/2009 |
| WO | WO 2009027718 A1 * | 3/2009 |

OTHER PUBLICATIONS

International Search Report dated Apr. 7, 2011 issued in PCT/GB2010/052173.

(Continued)

*Primary Examiner* — Timothy A Brainard
(74) *Attorney, Agent, or Firm* — Scully, Scott, Murphy & Presser P.C.

(57) ABSTRACT

There is disclosed a method for counteracting the effect which crags and other such environmental formations can have on radar returns or returns in similar sensor systems. In particular it has been found that the gaps between crags can lead to false detections because of firstly the function of certain signal processors which compare the high frequency return from a certain cell to a low frequency return from that cell, and secondly the effect of smearing of the returns from one cell to another. The invention seeks to mitigate this effect by selecting the maximum low frequency return from a group of range cells as the high frequency offset.

19 Claims, 4 Drawing Sheets

(56) References Cited

OTHER PUBLICATIONS

Extended European Search Report dated Jun. 15, 2010 issued in EP 10250020.4.

UK Search Report dated May 10, 2010 issued in GB1000209.5.
International Preliminary Report on Patentability and Written Opinion, dated Jul. 19, 2012 from related International Application No. PCT/GB2010/052173.

* cited by examiner

Objects A and B

Object A alone
High Frequency
Components Smeared by filters

Object B alone
High Frequency
Components Smeared by filters

Objects A and B
High Frequency
Components Smeared by filters

Object A alone

Object B alone

Objects A and B

Objects A and B

METHOD OF DETECTING A CLUTTER RETURN AT A SENSOR

The present invention relates to a method of detecting a clutter return at a sensor, in particular in a radar system.

It is well known in ranging and detection sensors, such as radar systems, that a signal transmitted to detect a target may be returned by a less interesting object, such as may be present in the background environment. Returns from less interesting objects are known as clutter returns or clutter.

It is desirable to suppress the processing of clutter returns; otherwise the radar system may incorrectly identify the clutter return as a return from a target. Such incorrect identifications are known as false detections.

Doppler filtering provides a well known method for suppressing the processing of clutter returns.

Doppler filtering divides a returned signal into a number of frequency bands (which may alternatively be referred to as frequency channels) according to the frequency of the returned signal or according to the frequency shift of the returned signal relative to the transmitted signal. Because the frequency and the frequency shift are related to the velocity of the object or target, the returned signal can thus be divided up according to the velocity of the object or target. Doppler filtering is generally good at helping to suppress the majority of the clutter returns because uninteresting objects tend to have zero or near-zero velocities. Thus clutter returns tend to have relatively low frequencies and small frequency shifts and so can be detected and suppressed accordingly.

However, some clutter returns have relatively high frequencies or large frequency shifts resulting from various known phenomena such as impurities in the transmitted signal or fluctuation of the object (internal motion of the object). Thus Doppler filtering alone tends not to be appropriate in distinguishing between the high frequency clutter returns and the high frequency returns from the target. (The skilled reader will understand that where the present specification discusses Doppler filtering and refers to high frequency returns, this term covers the returns which exhibit a relatively large frequency shift, and where reference is made to low frequency returns this term covers the returns which exhibit a relatively small frequency shift).

The applicant's earlier international patent application PCT/GB2008/050663 provides for a method whereby high frequency clutter returns may be detected and so suppressed. In particular, it is known from PCT/GB2008/050663 to process returns from a particular range cell so as to identify a low frequency band clutter return, then to derive a clutter residue from this return, which can be compared to the high frequency return to identify the component of the high frequency return which is clutter.

The applicant is satisfied that the method of PCT/GB2008/050663 improves the inhibition of false detections from strong, high frequency clutter returns in the majority of situations.

However, the applicant has discovered a limited number of situations where the method taught in PCT/GB2008/050663 can still lead to false detections. In particular, such a situation occurs where the sensor is receiving returns from a less interesting object or set of objects formed of a material that generally gives strong returns but which has a sizeable discontinuity in it that gives no returns. The applicant first observed this situation when testing the method disclosed in PCT/GB2008/050663 on rocky outcrops (alternatively referred to as crags or tors) which have a plurality of generally pillar-shaped rock formations.

In broad terms, it is an aim of the present invention to provide a signal processing system for a radar (or other sensor system) that may mitigate at least one of the disadvantages of the prior art identified above.

According to a first aspect of the invention there is provided a method for detecting a clutter return at a sensor, in particular in a radar system, the method comprising:
a) receiving a signal comprising
   a return from a first range cell and
   a return from a second range cell,
b) filtering the return from the first range cell according to frequency to determine:
   a component of the return from the first range cell that is in a first frequency band and
   a component of the return from the first range cell that is in a second frequency band,
c) filtering the return from the second range cell according to frequency to determine a component of the return from the second range cell that is in the second frequency band,
d) calculating from:
   I the magnitude of the component of the return from the first range cell that is in the second frequency band; and
   II the magnitude of the component of the return from the second range cell that is in the second frequency band,
   an estimated clutter residue in the component of the return from the first range cell that is in the first frequency band, such that the estimated clutter residue in the component of the return from the first range cell that is in the first frequency band may be discarded.

Thus the estimated clutter residue, for example that which is residual in the first frequency band as a result of the second frequency band, can be suppressed from the first frequency band component from the first cell. Thus these clutter returns can tend to be suppressed from further processing which could lead to false detections. The estimated clutter residue has been derived not only from the second-band component from the first range cell but also from the residue in the second-band frequency returns from a nearby range cell (i.e. the second range cell). In general, the first range cell will be proximal to the second range cell. As a result of this method, when the returns from a second cell act to distort the returns of a first cell, this distortion will tend to be suppressed.

This method may further comprise at step a) receiving a return from a third range cell; at step c) filtering the return from the third range cell according to frequency to determine a component of the return from the third range cell that is in the second frequency band; and at step d) calculating additionally from III the magnitude of the component of the return from the third range cell that is in the second frequency band, the estimated clutter residue in the component of the return from the first range cell that is in the first frequency band.

By considering a third cell, which in general will be proximal to the first range cell, the likelihood of obtaining a reliable estimate of the clutter residue tends to increase. This is particularly so where a first cell has its returns distorted by the combined influence of returns from a second and third range cell.

Such a combined influence may be particularly acute where the second range cell and the third range cell are immediately next to and either side of, the first range cell.

In such situations, and in the absence of the present invention, the influence of the returns from the second and third cell can be sufficient to cause a false detection.

The second frequency band may be centred at zero and as such correspond to zero-velocity clutter.

Such a second frequency band (that is to say, the frequency band corresponding to a zero frequency shift) is assumed to contain the majority of clutter returns and so by thus calibrating the filter band, it can be determined which range cells contain uninteresting objects which may be influencing returns from nearby cells.

At step d), the method may comprise calculating the estimated clutter residue by determining which of the components in the second frequency band has the maximum magnitude.

This will tend to minimise false alarms insofar as it will tend to identify the maximum clutter residue potentially present in the cells.

At step d), the method may comprise subtracting the clutter residue from the first frequency-band components from the first range cell. In this way the influence of the nearby cell on the cell in question can be suppressed.

In steps b) and c) the received signal may be filtered using at least one Doppler filter to obtain the component in the first frequency band and the component in the second frequency band.

Such a provision allows more than two frequency bands to be considered when determining the clutter residue. This tends to improve the precision of the estimate.

The clutter residue for each range cell associated with each frequency component may be calculated according to the following equation: residue($k_n$) =max[$Signal_0$(r−N), $Signal_0$ (r−(N−1)), ... $Signal_0$(r) ..., $Signal_0$(r+(N−1)), $Signal_0$(r+N)]−imp($k_n$) where residue($k_n$) is the clutter residue for a Doppler filter $k_n$, $Signal_0$(r) is the low frequency component of the signal for the $r^{th}$ range cell, N is the number of range cells either side of range cell r, that are referenced to calculate the estimated clutter residue in cell r, and imp($k_n$) is a predetermined offset for a Doppler filter $k_n$.

Such an algorithm may be readily implemented in a computer, a digital signal processing (DSP) card or such, so as to enable the method to be practised at the requisite high speed.

In steps b) and c) the received signal may, as an alternative to Doppler filtering, be passed through a Moving Target Indicator (MTI) filter.

Thus the present invention is not limited to use in pulse-Doppler radar systems, where the number of frequency bands tends to be large, but can equally be used in a radar system where the number of frequency bands is considerably lower. For example, the number of frequency bands may be as low as two (with high-pass and low-pass filtering) as would be the case where moving target indication (MTI) processing is employed.

Between step a) and step b) the received signals may be phase rotated. Thus the method can be used on a moving platform without the relative movements between the platform and the non-interesting stationary objects causing moving targets to be falsely detected.

At step a) receiving a signal may involve receiving a burst of signals.

According to a second aspect of the invention there is provided a computer program product comprising a computer readable medium, having thereon computer program code means, which when loaded onto a computer and executed cause the computer to implement a method of detecting a clutter return at a sensor according to any one of the methods of the first aspect of the invention.

According to a third aspect of the invention there is provided a signal processor for detecting a clutter return at a sensor, in particular in a radar system, the signal processor comprising:
a) A receiver for receiving a signal comprising
   a return from a first range cell and
   a return from a second range cell;
b) a filter, operably connected to the receiver, for filtering the return from the
   first range cell according to frequency to output
      a component of the return from the first range cell that is in a first frequency band and
      a component of the return from the first range cell that is in a second frequency band,
   and for filtering the return from the second range cell according to frequency, to output
      a component of the return from the second range cell that is in the second frequency band,
c) a false alarm controller comprising
   A a residue prediction processor, operably connected to the filter, for calculating from
      I the magnitude of the component of the return from the first range cell that is in a second frequency band; and
      II the magnitude of the component of the return from the second range cell that is in the in the second frequency band, the magnitude of a clutter residue in the component of the return from the first range cell that is in a first frequency band,
   B a summer, operably connected to the residue prediction processor and the filter, suitable for subtracting the estimated clutter residue from the return from the first range cell that is in a first frequency band.

The second range cell may be proximal to the first range cell.

The filter may be a bank of Doppler filters or alternatively an MTI filter.

A complex to log modulus processor may be interconnected between the filter and the false alarm controller.

A processor, for compensating for platform and antenna motion may be interconnected between the receiver and the filter.

For a better understanding of the present invention, an embodiment will now be described, by way of example, and with reference to the accompanying drawings, of which:

Figure 1:
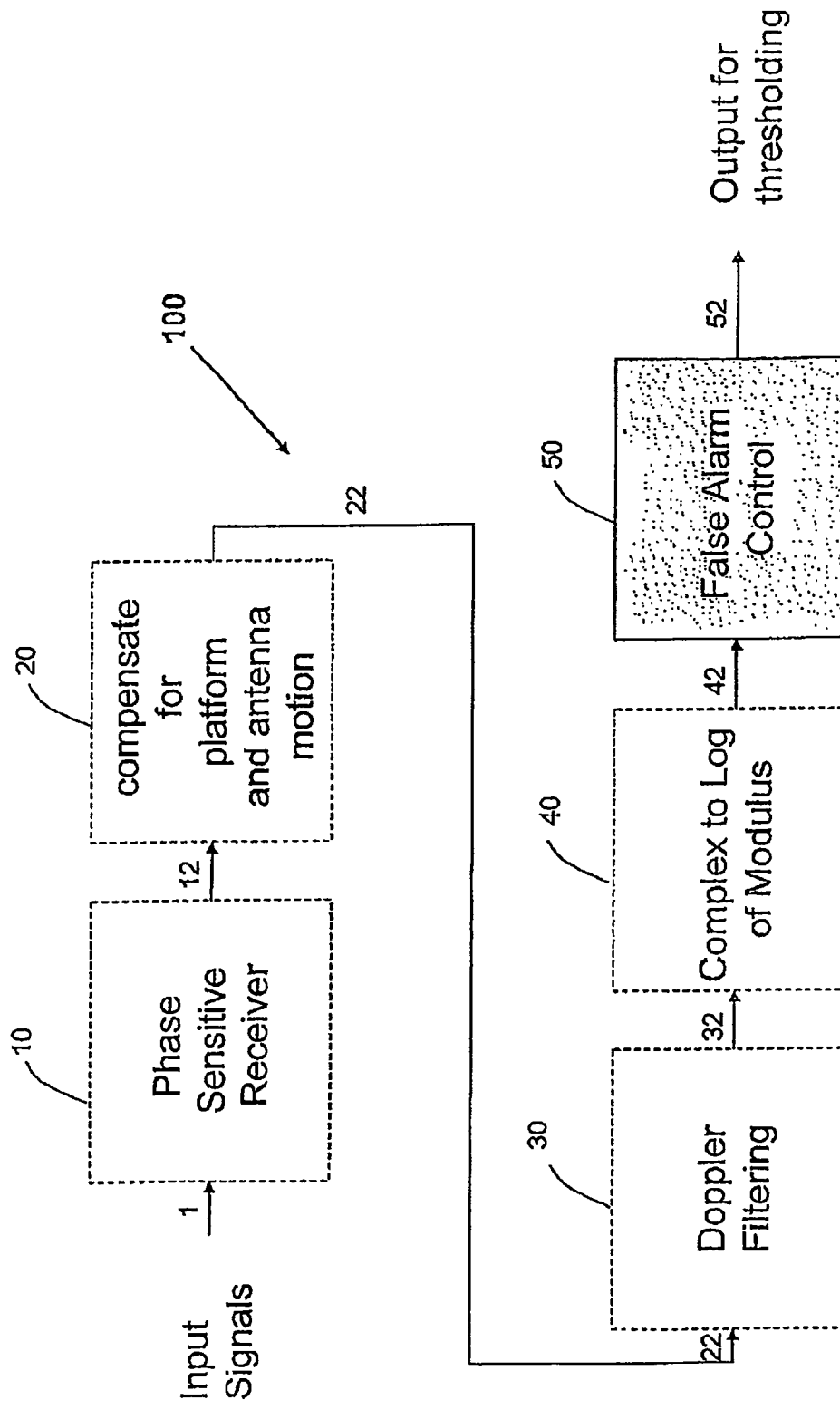
FIG. 1 is a block diagram representing a signal processor of a sensor in a radar system.

Referring to FIG. 1, a signal processing system 100 for a sensor in a pulse—Doppler radar system is shown, which signal processing system 100 receives input signals 1 and outputs signals 52 for thresholding.

The signal processing system 100 comprises a phase-sensitive receiver unit 10, a motion compensation unit 20, a Doppler filtering unit 30, a 'complex to log of modulus' unit 40 and a false alarm control unit 50.

The phase-sensitive receiver unit 10 is operably connected to the motion compensation unit 20. The motion compensation unit 20 is operably connected to the Doppler filtering unit 30. The Doppler filtering unit is operably connected to the 'complex to log of modulus' unit 40. The 'complex to log of modulus' unit 40 is operably connected to the false alarm control unit 50.

Figure 2:
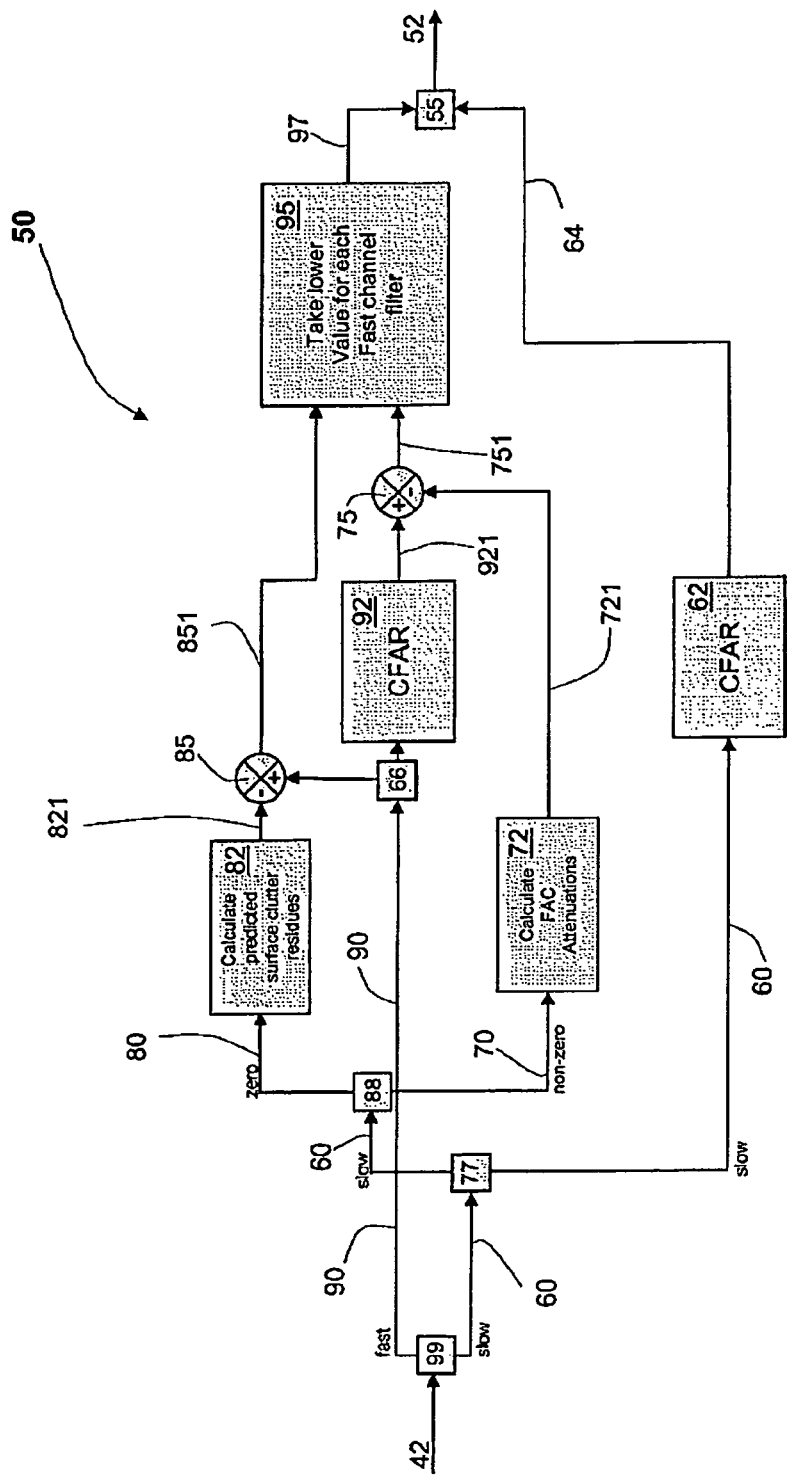
FIG. 2 is a block diagram representing a false alarm control system in accordance with the present invention.

The False Alarm Control (FAC) unit 50 is shown in more detail in FIG. 2, where it can be seen that the complex to log modulus unit 40 is operably connected to a filter 99 within the FAC unit 50

The filter 99 is operably connected to a fast channel splitter 66 and a slow channel splitter 77.

The slow channel splitter 77 is connected to a slow channel CFAR 62, which is in turn operably connected to a combiner 55.

The slow channel splitter 77 is also operably connected to a slow channel filter 88. The slow channel filter 88 is operably connected to a calculate predicted surface clutter residues unit 82, which is in turn connected to a first summer 85.

Further, the slow channel filter 88 is connected to a Calculate FAC attenuation unit 72, which is operably connected to a second summer 75.

The fast channel splitter 66 is operably connected to the first summer 85 and a fast channel CFAR 92. The fast CFAR 92 is further operably connected to the second summer 75.

Both of the summers 85 and 75 are operably connected to a comparator 95, which comparator 95 is connected to the combiner 55.

In operation, the returns, which in this embodiment are a burst of received pulsed signals 1, are input to the phase-sensitive receiver unit 10 where they are 'down-mixed' to form digitised, complex, base band signals 12 comprising 'real' and 'imaginary' components known as I and Q respectively.

The digitised base band signal components 12 are then passed to the motion compensation unit 20 where they are processed to compensate for platform and antenna motion. In particular, the I and Q components 12 are phase rotated so as to form motion-compensated components 22. This is so that the returns from a non-fluctuating target that is stationary with respect to the surface of the earth have the same phase on each pulse of a coherent 'burst' of pulses.

The motion-compensated components 22 are then input to the Doppler filtering unit 30 where they are filtered by frequency into a number of frequency bands by a series of Doppler filters (not shown) to form filtered components 32. The number of frequency bands must be at least two, but in most pulse-Doppler radar systems, the number of frequency bands exceeds four.

After filtering, the components 32 are converted to log modulus values 42 using the equation:

$$\text{Logmod} = \alpha \cdot \log_\beta(I^2 + Q^2) \quad \text{Equation 1}$$

where $\alpha$ and $\beta$ are constants chosen according to known practice to be consistent with the rest of the signal processor.

The values 42 include log modulus values for each Doppler filter channel.

The values 42 are then passed to the false alarm control unit 50 where they are processed to provide output signals 52, which can be compared with a fixed or constant threshold value for detection.

As can be seen from FIG. 2, at the false alarm control unit 50 the log modulus output signals 42 are arranged into four channels (60, 70, 80, 90) according to their associated frequency band and Doppler filter.

The output signals 42 are divided at the filter 99 into a fast channel 90 and a slow channel 60.

The fast channel 90 is input to the fast CFAR 92 and the first summer 85. The fast CFAR 92 uses known CFAR algorithms to generate an output 921 which is input to the second summer 75.

The slow channel 60 is duplicated at the splitter 77 to form two branches.

One of the branches of slow channel 60 is input to the slow CFAR 62. The input signals are processed by the slow CFAR 62 using known CFAR algorithms to produce output signals 64 indicative of the slow channel filters.

The other branch of slow channel 60 is divided at the filter 88 to form a zero channel 80 (comprising the signals from the zero Doppler filters) and a non-zero channel 70 (comprising the signals from the filters not at zero Doppler).

The zero Doppler channel 80 is input to a processor 82 for calculating predicted surface clutter residues. The processor 82 is operably connected to the first summer 85. At the first summer 85 the clutter residues are subtracted from the signals in the fast channel 90 to provide an input to the comparator 95.

The non-zero channel 70 is input to a processor 72 so as to calculate a set of False Alarm Correction (FAC) attenuations. The processor 72 is operably connected to a second summer 75. The second summer 75 subtracts the output 721 of the processor 72 from the output 921 of the fast CFAR 92 to provide a further input 751 to the comparator 95.

Normally, except in exceptional extreme weather conditions, unwanted echoes or "clutter" from the environment such as the surface of the earth or weather precipitation will be contained within a small number of the Doppler filters. In particular, the "clutter" will be contained within Doppler filters with pass bands at or near zero Doppler. The filters with such pass bands are chosen for the slow channel 60. The fast channel 90 will contain all the other filters.

The processor 100 makes two estimates of the clutter background in the fast channels of each range cell. The first estimate is the output from summer 85, the second being the output from summer 75.

The comparator 95 takes the lower of the two inputs, from the first summer 85 and the second summer 75, to provide an output signal 97 indicative of the fast channel filters.

The first estimate of the clutter background in the fast channel 90 is thus calculated using the signal strength (in a given range cell) from the Doppler filter centred at (or nearest to) zero Doppler (referred to below as Doppler filter 0). The first estimate is an estimate of surface "clutter" residues (and may well fall below the noise level).

How the surface clutter residues are estimated determines how the invention operates. In the applicant's earlier application PCT/GB2008/050663 the surface "clutter" residues are calculated such that for each range cell, and using the log modulus value of Doppler filter 0, a set of predicted (worst case) "clutter" residues values can be calculated (one for each Pulse Doppler fast channel filter), according to the following equation:

Prior Art  Equation 2

$$\begin{aligned} residue_k &= Signal_0 - imp_k \quad \text{if } Signal_0 > imp_k \\ &= 0 \quad \text{otherwise} \end{aligned}$$

where k is the fast channel filter number;

Signal$_0$ is the log modulus of the signal amplitude in filter 0; and imp$_k$ is the logarithm (derived assuming the same α and β as above) of the (worst case) surface "clutter" improvement factor in filter k (that is, the expected level of high frequency signals at the receiver output with respect to the low frequency signals from a clutter source).

In PCT/GB2008/050663, Equation 2 is implemented in a processor at an equivalent position in the architecture to processor 82.

However the inventor has found at least one situation where the operation of Equation 2 in conjunction with the first summer 85 may not inhibit false detections effectively. Such a situation is represented in FIGS. 3a-d and 4a-d.

FIGS. 3a-d are graphs representing the returns at various frequencies from a set of consecutive range cells 202, 204, 206, 208, 210 and 212.

The range cell 204 contains a generally static background object, object A. The range cell 206 beyond the range cell 204 contains no object, and the range cell 208 beyond the range cell 206 contains another generally static background object, object B. Both the object A and the object B give strong returns. There are no other objects in the proximal range cells 202, 210 and 212.

Figure 3A:
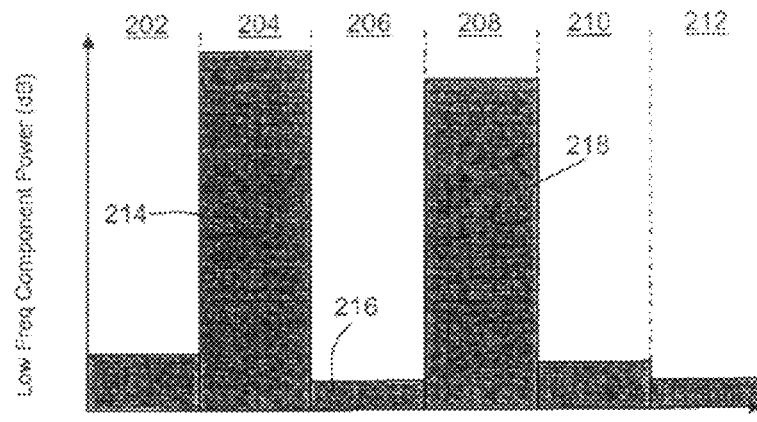
FIG. 3a is a graph representing the power of low frequency returns from a set of consecutive range cells, one range cell containing an object A, one range cell containing an object B.

As can be seen in FIG. 3a, which represents a burst of returns in the slow channel filters (e.g. slow channel 60 in FIG. 2), there are distinct peaks associated with the range cells 204, 208 in which the objects A and B are actually sited. The slow channel return 216 associated with the range cell 206 appears negligible (particularly in comparison with the returns associated with the neighbouring cells 204 and 208), which is as expected since there is no actual object in range cell 206.

Figure 3B:
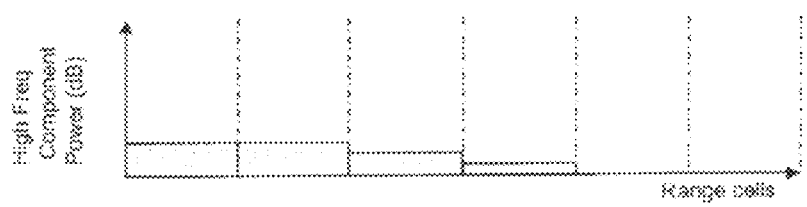
FIG. 3b is a graph representing the power of high frequency returns that have been returned by the object A.
Figure 3C:
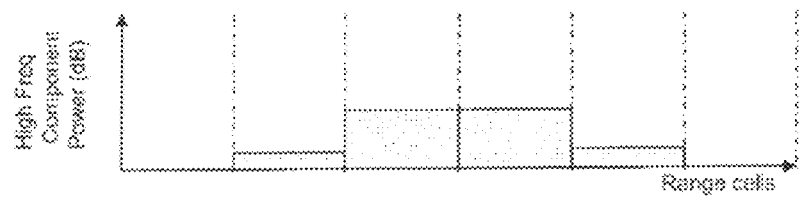
FIG. 3c is a graph representing the power of high frequency returns that have been returned by the object B.
Figure 3D:
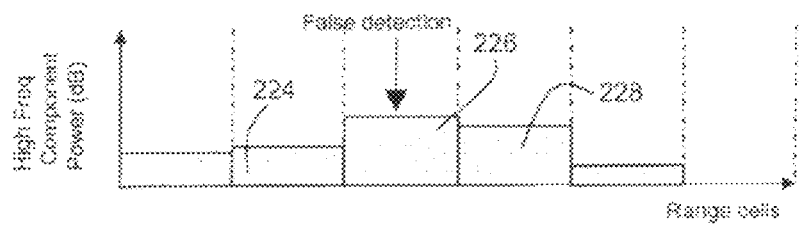
FIG. 3d is a graph representing the power of high frequency returns that have been returned by the object A and the object B.

However, referring to FIG. 3d, the returns in the fast channel filters exhibit a peak 226 associated with range cell 206. There is no object or target in this range cell, and so the peak 226 is unexpected. Further, the combined operation of the algorithm of Equation 2 with the first summer 85 will not tend to suppress this return because the high frequency return 226 (in fast channel 90) is insufficiently less than (and in this example is greater than) the low frequency return 216 at cell 206. This lack of suppression of the return 226 may lead to a false detection.

The inventor has determined that the peak 226 can be explained by at least two phenomena.

The first of these phenomena may be better understood by reference to FIG. 3b which, for simplicity of demonstrating this first phenomenon, shows a graph of the fast channel returns associated with object A alone. Even though object A is generally static, there are low power returns in the fast channel associated with the range cell which object A occupies (as mentioned above, such fast channel returns can be explained by impurities in the transmitted signal and/or fluctuations at the illuminated object). However, the fast channel returns associated with object A are 'smeared' into the neighbouring range cells 202, 206, and 208 as a consequence of the action of receiver filters in the sensor 100. Examples of such receiver filters would include the band pass filter and the pulse compression filter.

The smearing of high frequency returns from object A may not be enough to establish a sufficiently great high-frequency peak in range cell 206. However, as FIG. 3c shows, a similar smearing effect is occurring as a result of the high frequency returns associated with object B.

It can therefore be appreciated that it is the combined effect of the smearing of the high frequency returns from both objects A and B that establishes a high frequency peak in the intervening range cell 206.

The other phenomenon whereby a peak such as the peak 326 may occur in the high frequency returns of an empty cell such as range cell 206, arises as a result of interference between the returns from objects A and B. This phenomenon is explained with reference of FIGS. 4a-d.

Figure 4A:
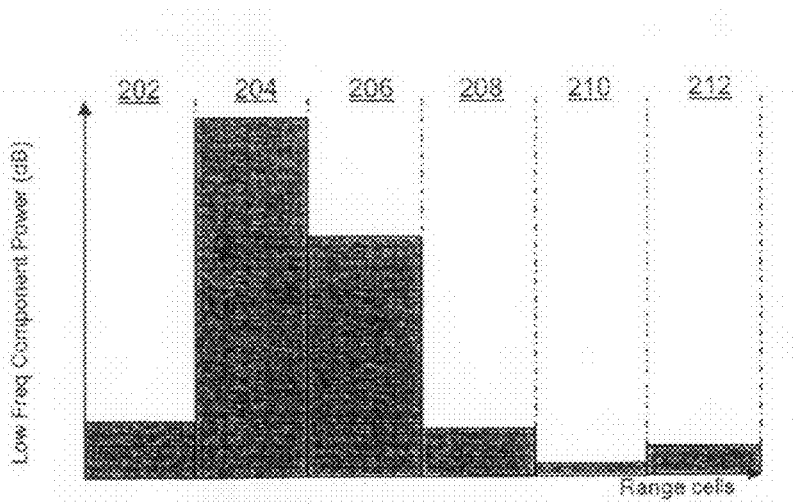
FIG. 4a is a graph representing the power of low frequency returns that have been returned from the object A.
Figure 4B:
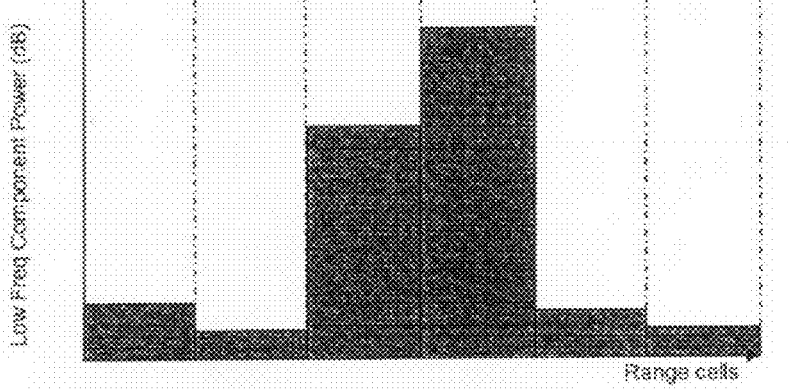
FIG. 4b is a graph representing the power of low frequency returns that have been returned from the object B.
Figure 4C:
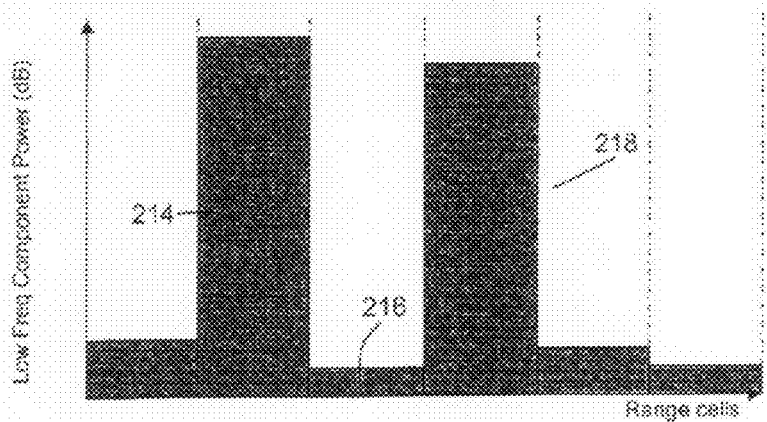
FIG. 4c is identical to FIG. 3a, it is reproduced to make easier the comparison with FIGS. 4a, b and d.
Figure 4D:
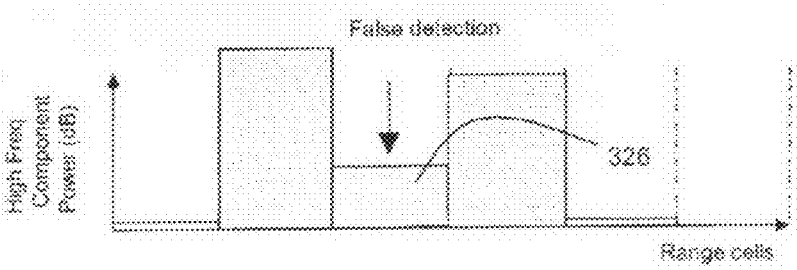
FIG. 4d is a graph representing the power of high frequency returns which have been returned by the combination of the object A and the object B.

As shown in FIG. 4a, the low frequency returns associated with object A may contain components which appear to have been returned from a neighbouring cell 206. In a similar manner, the low frequency returns associated with object B may contain components which appear to have been returned from a neighbouring cell, see FIG. 4b. This particular 'smearing' effect may be because either a) the target is near the boundary between the adjacent range cells 204 and 206 or b) as a result of the receiver filtering the response of the low frequency components from the target have been spread across more than one range cell or c) the nominal bandwidth of the signals from a target is less than the range cell rate or d) a combination of any or all of a) to c).

However, when both objects A and B are illuminated, the low frequency returns can tend to destructively interfere with each other so as to cancel out the low frequency returns from neighbouring range cells which appear when only A or B are illuminated.

The high frequency returns from an illumination of either object A alone or object B alone will also include returns which appear to have come from a neighbouring cell.

However, unlike the low frequency returns, when the objects A and B are illuminated, the high frequency returns may not destructively interfere with each other and so the peak at cell 206 will remain. Again, combined operation of the algorithm of Equation 2 at processor 82 with the first summer 85 will not tend to suppress this return because the high frequency return 326 is insufficiently less than (and in this example is greater than) the low frequency return 216 at cell 206.

To mitigate the false detections which these phenomena tend to lead to, the processor 82 calculates the clutter residues as follows:

$$\text{residue}(k_n) = \max[\text{Signal}_0(r-N), \text{Signal}_0(r-(N-1)), \ldots, \text{Signal}_0(r-1), \text{Signal}_0(r), \text{Signal}_0(r+1), \ldots, \text{Signal}_0(r+(N-1)), \text{Signal}_0(r+N)] - \text{imp}(k_n) \quad \text{Equation 3}$$

where residue (k$_n$) is the clutter residue for a Doppler filter k$_n$

Signal$_0$(r) is the low frequency component of the signal for the r$^{th}$ range cell, N is the number of range cells, either side of range cell r, that are referenced to calculate the estimated clutter residue in cell r, for example where N=2, residue (k$_n$) =max[Signal(r−2)$_0$. Signal$_0$(r−1), Signal$_0$(r), Signal$_0$(r+1), Signal$_0$(r+2)]−imp(k$_n$), and imp(k$_n$) is a predetermined offset for a Doppler filter k$_n$.

By thus taking the maximum low frequency clutter value from a 'snapshot' of proximal range cells and then offsetting by parameter imp(k$_n$), an estimate for the clutter residue can be determined. This clutter residue estimate may then be subtracted (at summer 85) from the fast filter channels to assist in counteracting the effect of smearing and interference occurring between neighbouring cells.

For example, in FIGS. 3a-d and 4a-d, the r$^{th}$ cell is range cell 206, the (r+1)$^{th}$ cell is the range cell 208 and the (r−1)$^{th}$ cell is range cell 204.

As in the application PCT/GB2008/050663, the offsetting parameter imp($k_n$) scales the expected high frequency clutter according to the expected ratio of a low frequency clutter return 214 from a background object (such as A) to the high frequency clutter component 224 from the same object.

The second estimate 751 of the clutter background in the fast channel 90 of the range cell in question is calculated firstly by considering the range cells around that range cell in the fast channel filter 90. This background clutter is estimated using a known CFAR algorithm (i.e. at the fast CFAR 92) or similar background averaging technique that estimates the background clutter level for each range cell by simply averaging the signals in nearby cells.

However, this estimate of the background clutter is modified to control false alarms in the presence of fast moving "clutter", anomalous "clutter", or "clutter" with strange spectral characteristics, by adding an offset, i.e. in the FAC attenuation, to the background (in the log domain) based on the strength in the signals non-zero channel 70.

The FAC attenuations 721 are calculated in the processor 72 by, for each range cell, finding the largest log modulus value in the non-zero channel 70 in the burst and comparing that value to a range-invariant threshold. If the threshold is exceeded, a set of attenuation values 721 (one for each fast channel filter in the burst) is calculated by using the excess (log modulus minus threshold) multiplied by a scaling factor to index a set of tables of attenuation values. If the threshold is not exceeded, all attenuations 721 in the set for the burst are zero.

There is a separate attenuation table for each non-zero channel filter, and each fast channel filter combination. The non-zero channel filter used in choosing the attenuation table is the filter containing the largest value. The choice of slow channel filters is immaterial in cases where the largest value occurs in more than one filter.

The attenuations 721 calculated in the processor 72 are applied to the log modulus data after fast CFAR in the fast channel 90. The attenuation 721 is subtracted from the fast CFAR 92 output 921. There is a separate attenuation for each range cell and each filter.

After applying the false alarm control attenuations 721 in the pulse-Doppler fast channel filters, the resulting value 751 is compared to the output 851 of the first summer 85 (i.e. to the difference between the fast channel 90/CFAR input and the predicted surface clutter residue). The lower value is chosen as the post-false alarm control log output 97.

In other words, for each fast channel filter and each range cell, two different estimates and of the "clutter" background are generated. The greatest of these is subtracted (in the log domain) from the signal in the range cell in question.

Expressed as an equation where cfar_input(k) corresponds to the signals on channel 90 (that is, the input to the fast CFAR 92), residue$_k$ corresponds to the output 821 of processor 82 (that is, the predicted surface "clutter" residues), cfar_output (k) corresponds to the output 921 of the fast CFAR 92, fac_atten(k) corresponds to the output 721 of processor 72 (that is, the false alarm control attenuation values), and fac_output(k) corresponds to the output 97 from the comparator 95 (that is, the resulting output from the low-loss false alarm control unit 50), then for fast channel filter number k in one range cell and burst, the interrelationship between the fast, slow and non-zero channels in calculating the output of comparator 95 is:

$$\text{fac\_output}(k) = \text{MIN}[(\text{cfar\_output}(k) - \text{fac\_atten}(k)), (\text{cfar\_input}(k) - \text{residue}_k)] \quad \text{Equation 4}$$

Equivalents and modifications not described above may also be employed without departing from the scope of the invention, which is defined in the accompanying claims.

The invention claimed is:

1. A method for detecting a clutter return at a sensor, the method comprising:
   a) receiving a signal comprising a return from a first range cell and a return from a second range cell;
   b) filtering the return from the first range cell according to frequency to determine: a component of the return from the first range cell that is in a first frequency band and a component of the return from the first range cell that is in a second frequency band,
   c) filtering the return from the second range cell according to frequency to determine a component of the return from the second range cell that is in the second frequency band,
   d) calculating from
      I the magnitude of the component of the return from the first range cell that is in the second frequency band; and
      II the magnitude of the component of the return from the second range cell that is in the second frequency band, an estimated clutter residue in the component of the return from the first range cell that is in the first frequency band, such that the estimated clutter residue in the component of the return from the first range cell that is in the first frequency band may be discarded.

2. A method according to claim 1 further comprising:
   at step a) receiving a return from a third range cell;
   at step c) filtering the return from the third range cell according to frequency to determine a component of the return from the third range cell that is in the second frequency band; and
   at step d) calculating from
      III the magnitude of the component of the return from the third range cell that is in the second frequency band, the estimated clutter residue in the component of the return from the first range cell that is in the first frequency band.

3. A method according to claim 2 wherein the second range cell and the third range cell are immediately next to and either side of, the first range cell.

4. A method according to claim 1 wherein the second frequency band is centred at zero and as such corresponds to zero-velocity clutter.

5. A method according to claim 1 further comprising at step d), subtracting the clutter residue from the first frequency-band components from the first range cell.

6. A method according to claim 1 wherein in steps b) and c) the received signal is filtered using at least one Doppler filter to obtain the component in the first frequency band and the component in the second frequency band.

7. A method according to claim 6 wherein the clutter residue for each range cell associated with each frequency component is calculated according to the following equation residue($k_n$)=max [Signal$_0$(r−N), Signal$_0$(r−(N−1)), ... Signal$_0$(r)..., Signal$_0$(r+(N−1)), Signal$_0$(r +N) ]−imp($k_n$)

where
residue($k_n$) is the clutter residue for a Doppler filter $k_n$
Signal$_0$(r) is the low frequency component of the signal for the $r^{th}$ range cell
N is the number of range cells, either side of range cell r, that are referenced to calculate the estimated clutter residue in cell r,
imp($k_n$) is a predetermined offset for a Doppler filter $k_n$.

8. A method according to claim 1 wherein in steps b) and c) the received signal is passed through a Moving Target Indicator (MTI) filter.

9. A method according to claim 1 wherein, between step a) and step b) the received signals are phase rotated.

10. A method according to claim 1 wherein at step a) receiving a signal involves receiving a burst of signals.

11. A method according to claim 1 wherein the second frequency band is a lower frequency band than the first frequency band.

12. A non-transitory computer readable medium having thereon computer program which when executed by a computer causes the computer to implement a method of detecting a clutter return at a sensor comprising:

receiving a signal comprising a return from a first range cell and a return from a second range cell;

filtering the return from the first range cell according to frequency to determine:

a component of the return from the first range cell that is in a first frequency band and a component of the return from the first range cell that is in a second frequency band, filtering the return from the second range cell according to frequency to determine a component of the return from the second range cell that is in the second frequency band, calculating from I the magnitude of the component of the return from the first range cell that is in the second frequency band; and II the magnitude of the component of the return from the second range cell that is in the second frequency band, an estimated clutter residue in the component of the return from the first range cell that is in the first frequency band, such that the estimated clutter residue in the component of the return from the first range cell that is in the first frequency band may be discarded.

13. A signal processor for detecting a clutter return at a sensor, the signal processor comprising:

a receiver for receiving a signal comprising
a return from a first range cell and a return from a second range cell, the second range cell being proximal to the first range cell;

a filter, operably connected to the receiver, for filtering the return from the first range cell according to frequency to output a component of the return from the first range cell that is in a first frequency band and a component of the return from the first range cell that is in a second frequency band, and for filtering the return from the second range cell according to frequency, to output a component of the return from the second range cell that is in the second frequency band, a false alarm controller comprising a residue prediction processor, operably connected to the filter, for calculating from I the magnitude of the component of the return from the first range cell that is in a second frequency band; and II the magnitude of the component of the return from the second range cell that is in the in the second frequency band, the magnitude of a clutter residue in the component of the return from the first range cell that is in a first frequency band, a summer, operably connected to the residue prediction processor and the filter, suitable for subtracting the estimated clutter residue from the return from the first range cell that is in a first frequency band.

14. A signal processor according to claim 13 wherein the filter is a bank of Doppler filters.

15. A signal processor according to claim 13 wherein the filter is an MTI filter.

16. A signal processor according to claim 13 wherein a complex to log modulus processor is interconnected between the filter and the false alarm controller.

17. A signal processor according to claim 13 wherein a processor, for compensating for platform and antenna motion is interconnected between the receiver and the filter.

18. A radar system comprising the signal processor of claim 13.

19. A signal processor according to claim 13 wherein the second frequency band is a lower frequency band than the first frequency band.

* * * * *